United States Patent
Foster

Patent Number: 5,749,774
Date of Patent: May 12, 1998

[54] VALVE REFACING TOOL

[76] Inventor: John R. Foster, P.O. Box 147, Lincolnville, Me. 04849-0147

[21] Appl. No.: 721,673

[22] Filed: Sep. 27, 1996

[51] Int. Cl.$^6$ ........................................................ B24B 3/05
[52] U.S. Cl. ............................ 451/252; 451/430; 451/557; 451/558
[58] Field of Search ................................ 451/252, 317, 451/319, 323, 430, 557, 558

[56] References Cited

U.S. PATENT DOCUMENTS

| | | | |
|---|---|---|---|
| 3,354,528 | 11/1967 | Appleby | 451/430 |
| 4,637,762 | 1/1987 | Acker | 451/430 |

FOREIGN PATENT DOCUMENTS

| | | | |
|---|---|---|---|
| 21899 | of 1929 | Australia | 451/430 |

*Primary Examiner*—Robert A. Rose
*Assistant Examiner*—George Nguyen

[57] ABSTRACT

A valve refacing tool comprising a hollow cylindrical column. The column has an upper end and a lower end and has a central bore throughout its entire length. The column has exterior threads at its upper end and an outwardly flared cylindrical support at its lower end. A crown is provided and has a central vertical bore with internal threads removably received by the threads at the upper end of the column. The crown has a lower surface with a radial interior edge adapted to be supported on the upper end of the column. The crown has a plurality of radially extending fins each with an enlarged height at its radially exterior edge and an upper surface at an angle with respect to the vertical. Each upper surface has a dove tail recess. A cylindrical bushing sleeve is positioned within the bore of the column. The bushing sleeve has an upper end located at an intermediate extent of the column and a lower end located beneath the lower end of the column. The bushing sleeve has spaced bushings of a bearing material adapted to receive and rotatably support the cylindrical stem of a valve to be ground. An aperture is formed in an intermediate extent of the column with a securement component positioned in the aperture to contact and position the sleeve with respect to the column. A plurality of grind pads are provided.

2 Claims, 5 Drawing Sheets

5,749,774

VALVE REFACING TOOL

BACKGROUND OF THE INVENTION

1. Field of the Invention

The present invention relates to a valve refacing tool and, more particularly, pertains to restoring concentricity between a valve face and its center line through a hand-held device.

2. Description of the Prior Art

The use of devices for grinding valves of various designs and configurations are known in the prior art. More specifically, devices for grinding valves of various designs and configurations heretofore devised and utilized for the purpose of restoring concentricity to valves through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 5,199,222 to Leroux et al., discloses a device for grinding the head of a valve, especially of an internal-combustion engine.

U.S. Pat. No. 5,070,653 to Amundsen discloses a centerless valve regrinder.

U.S. Pat. No. 4,428,160 to Willemsen et al., discloses centerless valve grinding.

U.S. Pat. No. 4,270,427 to Colberg et al., discloses a bevel angle setting means for a power tool apparatus.

U.S. Pat. No. 4,930,261 to Tiegs et al., discloses a valve resurfacing apparatus and method for making the same.

Lastly, U.S. Pat. No. 5,159,786 to Amundsen discloses a method for regrinding a work valve.

In this respect, the valve refacing tool according to the present invention substantially departs from the conventional concepts and designs of the prior art, and in so doing provides an apparatus primarily developed for the purpose of restoring concentricity between a valve face and its center line through a hand-.

Therefore, it can be appreciated that there exists a continuing need for new and improved valve refacing tool which can be used for restoring concentricity between a valve face and its center line through a hand-. In this regard, the present invention substantially fulfills this need.

SUMMARY OF THE INVENTION

In view of the foregoing disadvantages inherent in the known types of devices for grinding valves of various designs and configurations now present in the prior art, the present invention provides an improved valve refacing tool. As such, the general purpose of the present invention, which will be described subsequently in greater detail, is to provide a new and improved valve refacing tool apparatus and method which has all the advantages of the prior art and none of the disadvantages.

To attain this, the present invention essentially comprises a new and improved valve refacing tool for restoring concentricity between the valve center line and the valve face, comprising, in combination, a hollow cylindrical die cast aluminum column. The column has an upper end and a lower end and has a central bore throughout its entire length. The column has exterior threads at its upper end and an outwardly flared cylindrical support at its lower end. A crown is provided and has a central vertical bore with internal threads removably received by the threads at the upper end of the column. The crown has a lower surface with a radial interior edge adapted to be supported on the upper end of the column. The crown has four radially extending fins. Each fin has an enlarged height at its radially exterior edge and an upper surface at an angle of 45 degrees with respect to the vertical. Each upper surface has a dove tail recess. A cylindrical bushing sleeve is positioned within the bore of the column. The bushing sleeve has an upper end located at an intermediate extent of the column and a lower end located beneath the lower end of the column. The bushing sleeve has spaced bushings of a bearing material adapted to receive and rotatably support the cylindrical stem of a valve to be ground. The bearing material is selected from the class of bearing materials including NYLON and BRONZE. An aperture is formed in an intermediate extent of the column with a securement component positioned in the aperture to contact and position the sleeve with respect to the column. A plurality of grind pads are provided. Each grind pad has an upper surface and a lower dove-tail projection positioned in an associated dove-tail slot of the crown with an associated locking bolt to secure the pads at a preset position on the upper surface of the crown. The grind pads each have on its upper surface an abrasive hard aluminum flex file with an adhesive backing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved valve refacing tool which has all the advantages of the prior art devices for grinding valves of various designs and configurations and none of the disadvantages.

It is another object of the present invention to provide a new and improved valve refacing tool which may be easily and efficiently manufactured and marketed.

It is a further object of the present invention to provide a new and improved valve refacing tool which is of a durable and reliable construction.

An even further object of the present invention is to provide a new and improved valve refacing tool which is susceptible of a low cost of manufacture with regard to both materials and labor, and which accordingly is then susceptible of low prices of sale to the consuming public, thereby making such devices for grinding valves of various designs and configurations economically available to the buying public.

Still yet another object of the present invention is to provide a new and improved valve refacing tool which provides in the apparatuses and methods of the prior art some of the advantages thereof, while simultaneously overcoming some of the disadvantages normally associated therewith.

Still another object of the present invention is to restoring concentricity between a valve face and its center line through a hand-held device.

Lastly, it is an object of the present invention to provide a valve refacing tool comprising a hollow cylindrical column. The column has an upper end and a lower end and has a central bore throughout its entire length. The column has exterior threads at its upper end and an outwardly flared cylindrical support at its lower end. A crown is provided and has a central vertical bore with internal threads removably received by the threads at the upper end of the column. The crown has a lower surface with a radial interior edge adapted to be supported on the upper end of the column. The crown has a plurality of radially extending fins each with an enlarged height at its radially exterior edge and an upper surface at an angle with respect to the vertical. Each upper surface has a dove tail recess. A cylindrical bushing sleeve is positioned within the bore of the column. The bushing sleeve has an upper end located at an intermediate extent of the column and a lower end located beneath the lower end of the column. The bushing sleeve has spaced bushings of a bearing material adapted to receive and rotatably support the cylindrical stem of a valve to be ground. An aperture is formed in an intermediate extent of the column with a securement component positioned in the aperture to contact and position the sleeve with respect to the column. A plurality of grind pads are provided. Each grind pad includes an upper surface and a lower dove-tail projection positioned in an associated dove-tail slot of the crown with an associated locking bolt to secure the pads at a preset position on the upper surface of the crown.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
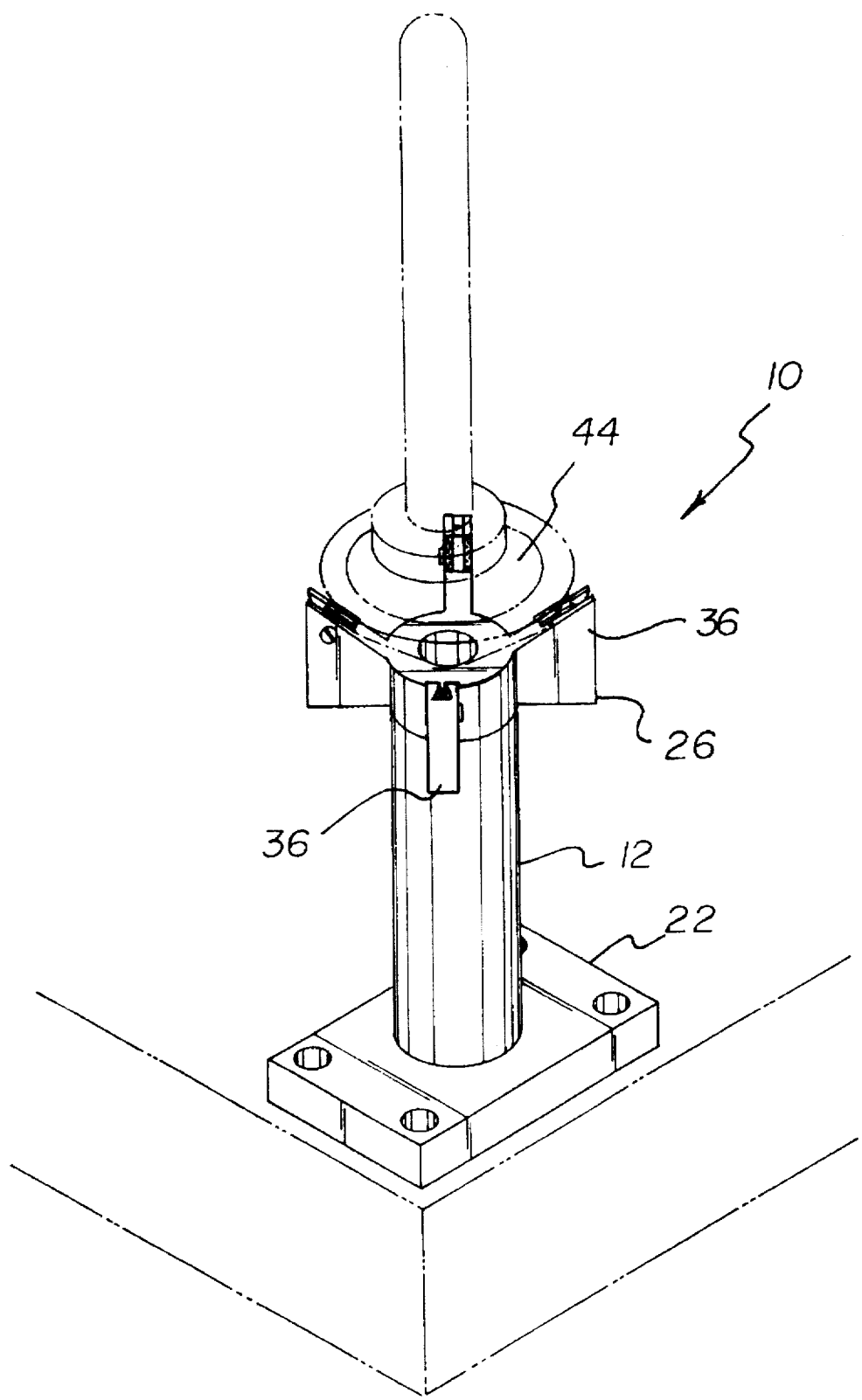
FIG. 1 is a perspective illustration of the preferred embodiment of the valve refacing tool constructed in accordance with the principles of the present invention.

With reference now to the drawings, and in particular to FIG. 1 thereof, a new and improved valve refacing tool embodying the principles and concepts of the present invention and generally designated by the reference numeral 10 will be described.

The present invention, the new and improved valve refacing tool, is comprised of a plurality of components. Such components in-their broadest context include a hollow cylindrical column, a crown, a cylindrical bushing sleeve, an aperture and a plurality of grind pads. Such components are individually configured and correlated with respect to each other so as to attain the desired objective.

A central component of the system 10 of the present invention is a column 12. The column is a hollow cylindrical die cast aluminum piece. It has an upper end 14 and a lower end 16. It also has a central vertical bore 18 throughout its entire length from the upper end to the lower end. In addition, the column has exterior threads 20 at its upper end. It also has an outwardly flared cylindrical support 22 at its lower end, preferably for being coupled with respect to a recipient support surface.

The next component of the system 10 of the present invention is a crown 26. The crown has a central vertical bore 28 concentric and coextensive with the bore of the column. Such bore of the crown has internal threads 30. Such threads are for removable receipt by the threads at the upper end of the column. The crown has a lower surface 32 with a radially interior edge 34. Such edge is adapted to be supported on the upper of the column. Note FIG. 4. The crown is also formed to have a plurality, preferably four, radially extending fins 36. Each fin has an enlarged height at its radially exterior edge 38. Each fin also has an upper surface 40 at an angle with respect to the vertical. Such angle is preferably 45 degrees from the vertical but may be 30 degrees or 60 degrees or any other appropriate angle as a function of the angle of the face 42 of the valve 44 to be ground to concentricity. In addition, each upper surface also has a dove-tail recess 46.

Another component of the system 10 is a cylindrical bushing sleeve 50. Such sleeve is concentric with and positioned within the bore of the column. The bushing sleeve has an upper end 52 located at an intermediate extent of the column. The bushing sleeve also has a lower end 54 located beneath the lower end of the column for being grasped by a user during operation and use. Note FIG. 4.

The bushing sleeve has an exterior surface 58 in contact with the interior surface of the bore of the column. It also has an interior cylindrical surface 60 supporting a plurality, preferably two, spaced bushings 62. Such bushings are of a bearing material adapted to receive and rotatably support the cylindrical stem 64 of the valve to be ground. The bearing material is preferably selected from the class of bearing materials including NYLON and BRONZE. The interior surface of the bushing is adapted to contact the exterior surface of the valve stem.

Figures 2, 3:
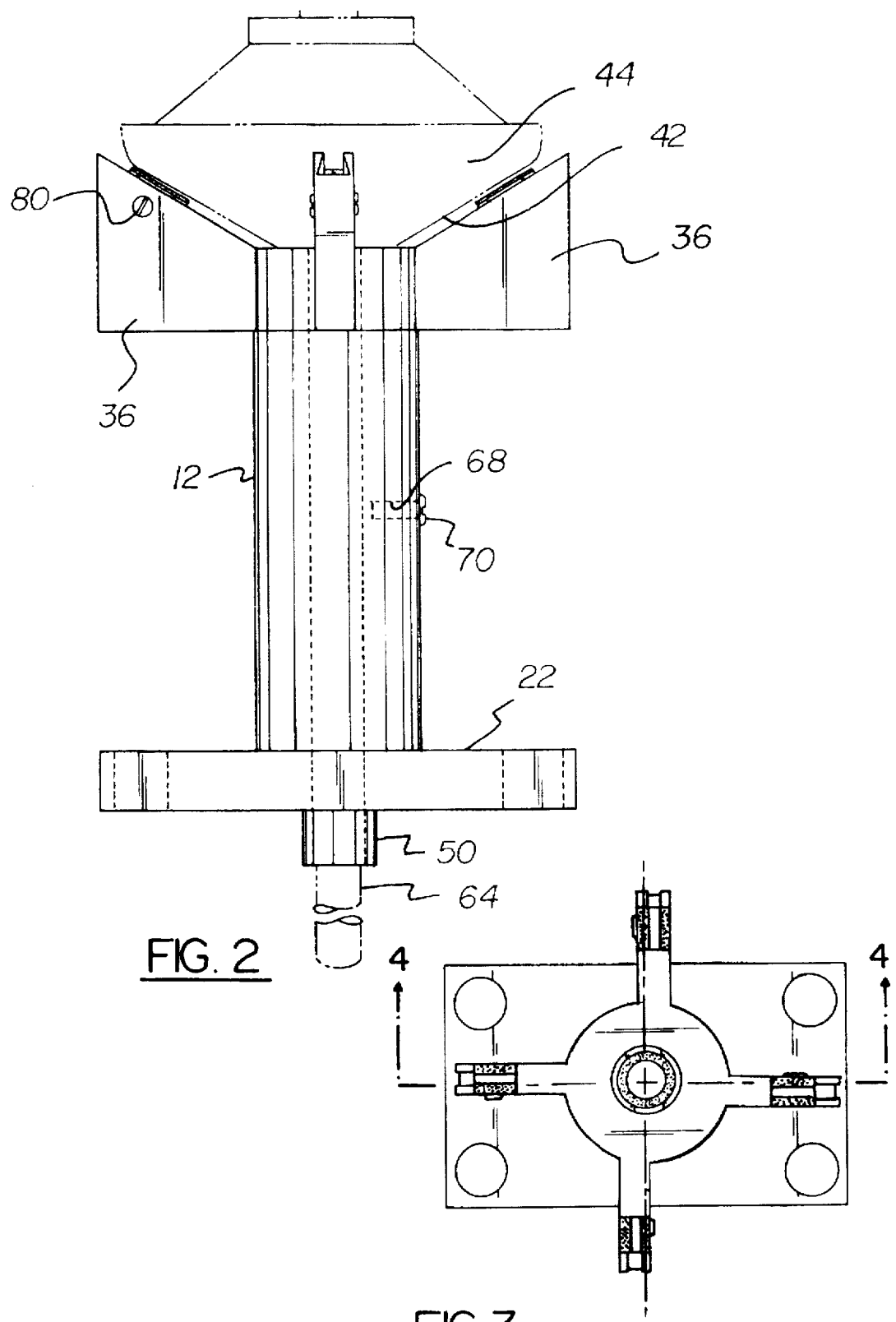
FIG. 2 is a side elevational view of the device shown in FIG. 1.
FIG. 3 is a top plan view of the device shown in FIGS. 1 and 2.
Figure 4:
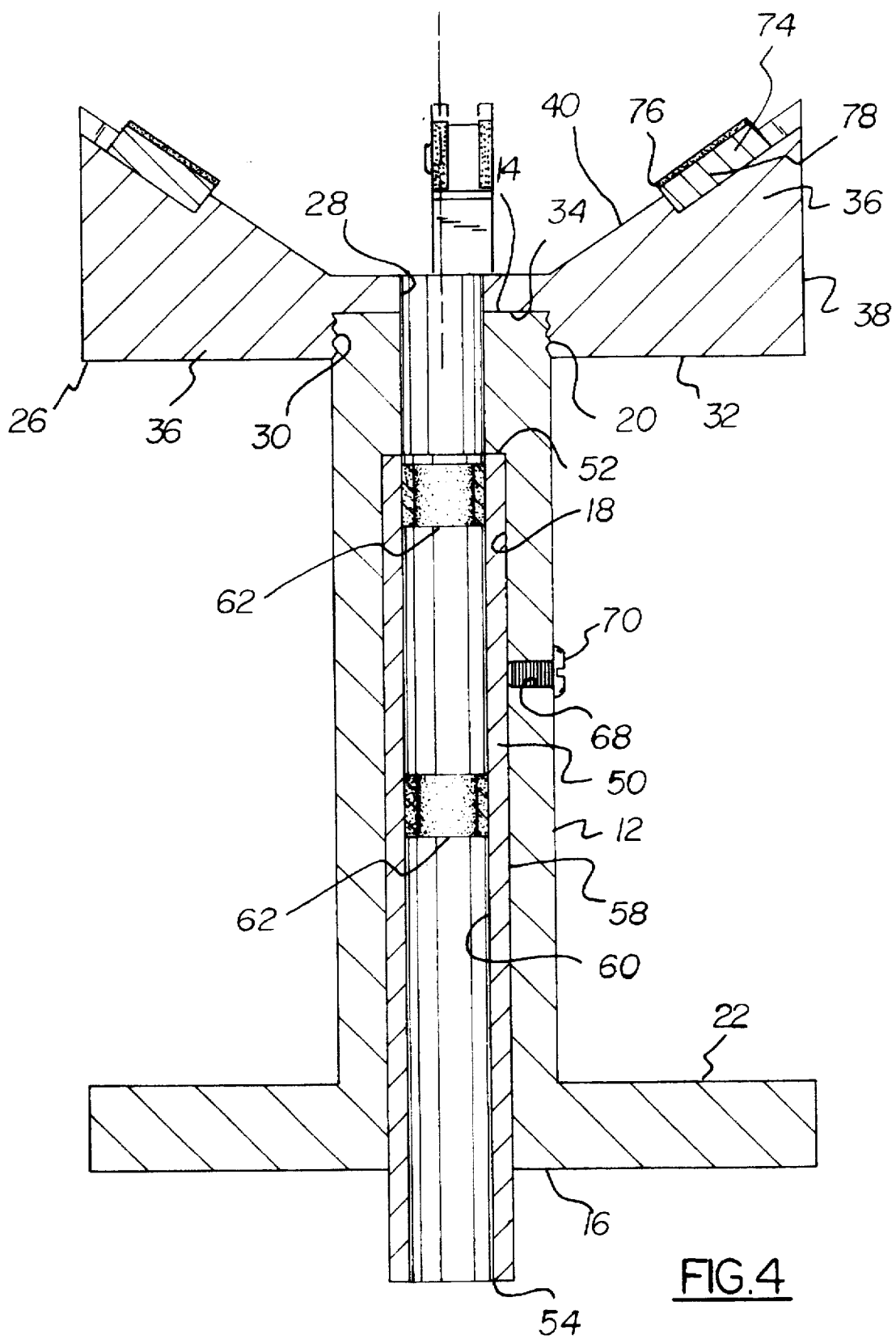
FIG. 4 is a cross sectional view taken along line 4—4 of FIG. 3.

Next provided is an aperture 68. Such aperture is formed at an intermediate extent of the column. In association therewith, a securement component 70 is positioned within the aperture to contact and position and hold the sleeve with respect to the column. As shown in FIGS. 2 and 4, the aperture is a threaded aperture and the securement component is a bolt. The bolt has an exterior end with a slot for adjustment by a user. The bolt has an interior end with a bearing surface to contact the exterior surface of the bushing sleeve. It should be understood, that various other types of securement relationships could be utilized such as aligned recesses or apertures in the bushing sleeve to make a more secure coupling between the securement component and the busing sleeve. In the alternative, the securement component could be a spring-biased ball received within one of a plurality of aligned recesses in the bushing sleeve.

Figure 5:
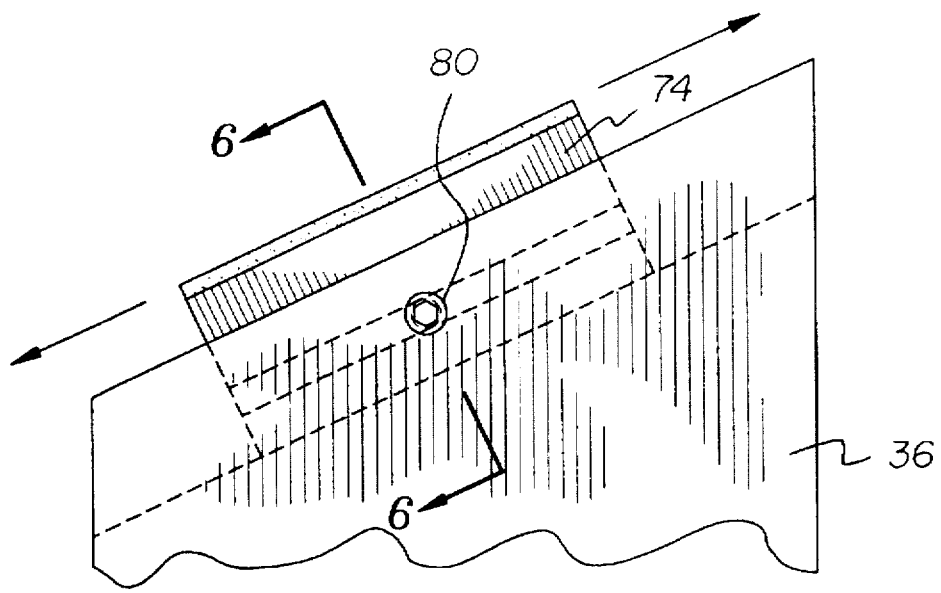
FIG. 5 is an enlarged side elevational view of one of the pads and its support.
Figure 6:
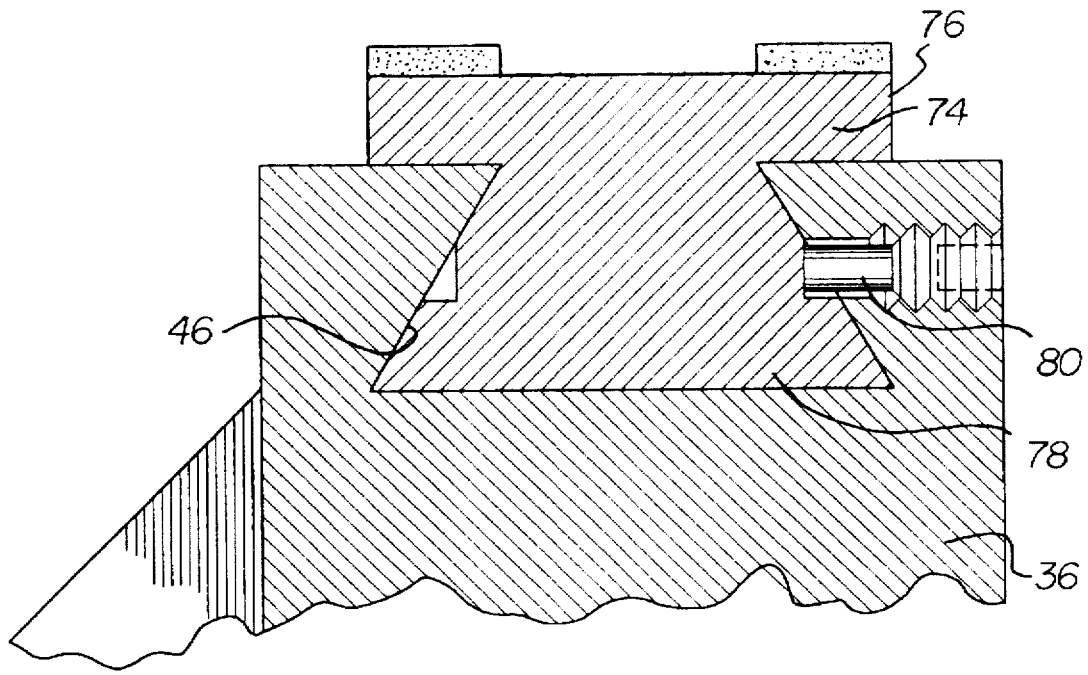
FIG. 6 is a cross sectional view taken along line 6—6 of FIG. 5.

Lastly provided is a plurality of grind pads 74. Each grind pad has an upper surface 76 and a lower dove-tail projection 78. The dove-tail projection is slidably positioned in an associated dove-tail slot of the crown. Each grind pad has an associated locking bolt 80. Such locking bolt extends through a threaded aperture in its associated fin. The locking bolt functions secure the pad in a preset position on the upper surface of the crown. Note FIGS. 5 and 6. The grind pads each have on its upper surface an abrasive hard aluminum flex-file with an adhesive backing for securing such abrasive material to the grind pad, preferably at spaced lateral locations on the upper surface thereof. As shown in FIG. 3, the grinding pads are off center to allow the pads to be inverted or, in other words, turned around 180 degrees to allow the use of both sides of the pads to extend the life and usefulness thereof.

Figure 7:
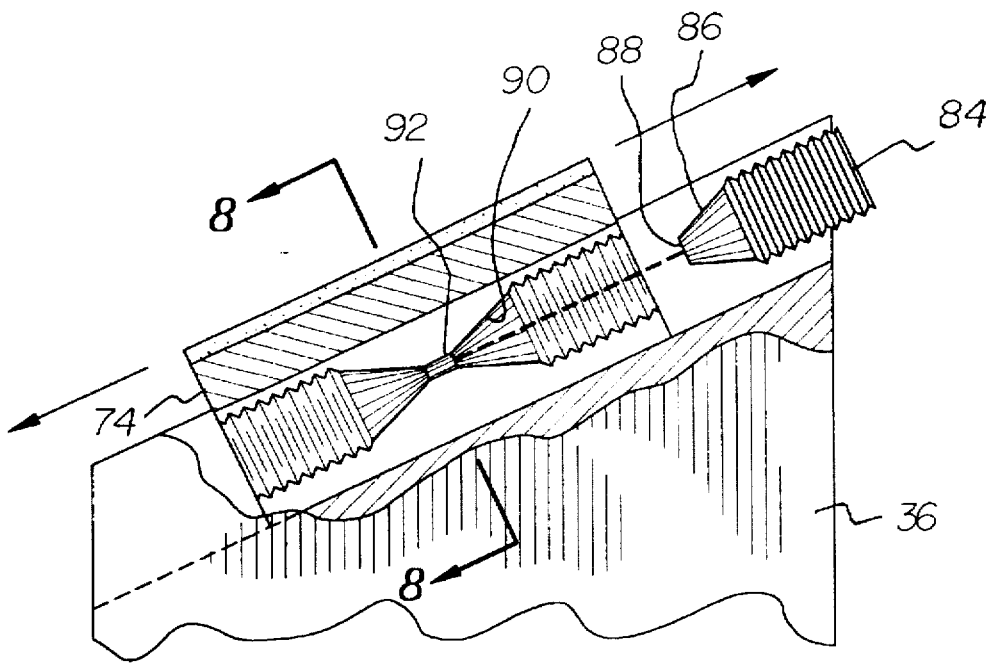
FIG. 7 is a view similar to FIG. 5 but showing an alternate embodiment of the invention.
Figure 8:
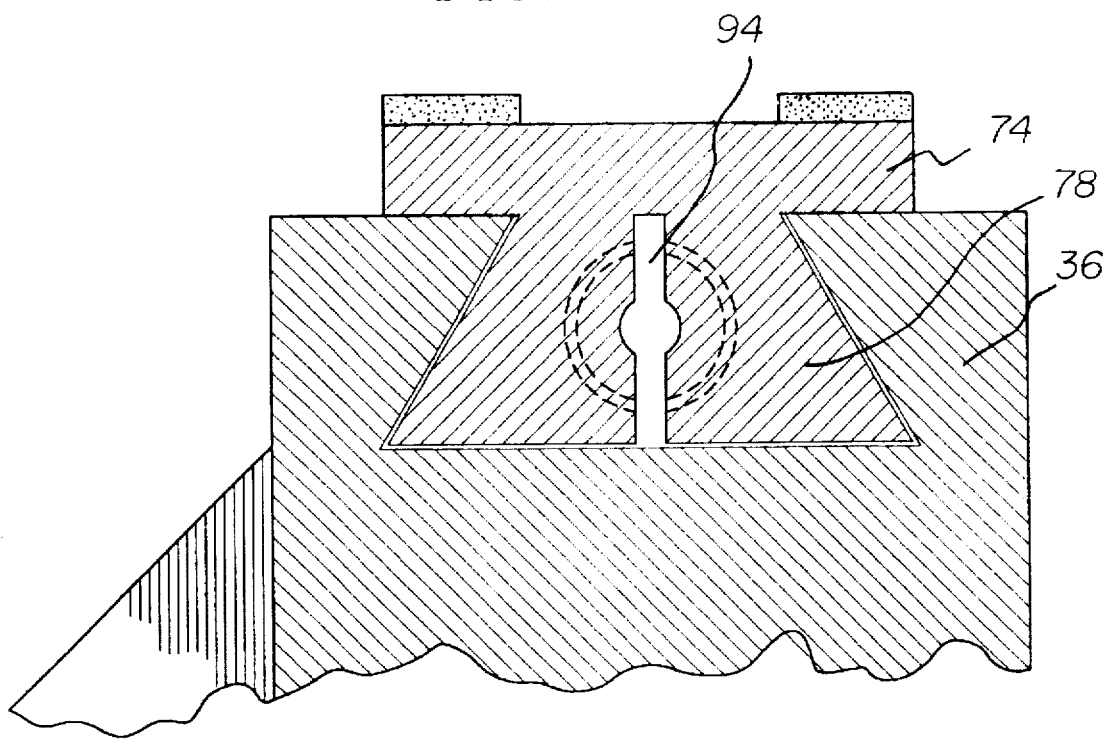
FIG. 8 is a cross sectional view taken along line 8—8 of FIG. 7.

An alternate embodiment of the invention is shown in FIGS. 7 and 8. According to such alternate embodiment, the securement component is a threaded pin 84. Such threaded pin has a tapering component 86 on its axially interior end 88. Such pin is adjustably received in a threaded aperture in a grind pad. The threaded aperture has a cone-shaped recess 90 at its axially interior end 92 at a different angle than that of the cone-shaped projection at the interior end of the threaded male member. In this manner, when the threaded member is threadedly inserted into the threaded aperture, the axially interior end thereof will cause an expansion of the dove-tail portion of the grind pad to lock it in position. A vertical slot 94 in the grind pad allows this locking relationship to occur.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed, readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved valve refacing tool for restoring concentricity between the valve center line and the valve face, comprising, in combination:

a hollow cylindrical die cast aluminum column having an upper end and a lower end and having a central bore throughout its entire length, the column having exterior threads at its upper end and an outwardly flared cylindrical support at its lower end for being coupled with respect to a recipient surface;

a crown having a central vertical bore with internal threads removably received by the threads at the upper end of the column, the crown having a lower surface with a radial interior edge adapted to be supported on the upper end of the column, the crown having four radially extending fins each with an enlarged height at its radially exterior edge and an upper surface at an angle of 45 degrees with respect to the vertical, each upper surface having a dove tail recess;

cylindrical bushing sleeve positioned within the bore of the column, the bushing sleeve having an upper end located at an intermediate extent of the column and a lower end located beneath the lower end of the column, the bushing sleeve having an exterior surface in contact with the interior surface of the column, the bushing sleeve having an internal surface with spaced bushings of a bearing material adapted to receive and rotatably support the cylindrical stem of a valve to be ground, the bearing material being selected from the class of bearing materials including NYLON and BRONZE;

an aperture formed in an intermediate extent of the column with a securement component positioned in the aperture to contact and position the sleeve with respect to the column; and a plurality of grind pads, each with an upper surface and a lower dove-tail projection positioned in an associated dove-tail slot of the crown with an associated locking bolt extended through a threaded aperture in an associated fin to secure the pads at a preset position on the upper surface of the crown, the grind pads each having on its upper surface an abrasive hard aluminum flex file with an adhesive backing for securing such abrasive material to the grind pad at spaced lateral locations on the upper surface thereof;

said grinding pads being off center to allow the pads to be rotated 180 degrees to allow use of both sides of the pads.

2. A new and improved valve refacing tool for restoring concentricity between the valve center line and the valve face, comprising, in combination:

a hollow cylindrical die cast aluminum column having an upper end and a lower end and having a central bore throughout its entire length, the column having exterior threads at its upper end and an outwardly flared cylindrical support at its lower end for being coupled with respect to a recipient surface;

a crown having a central vertical bore with internal threads removably received by the threads at the upper end of the column, the crown having a lower surface with a radial interior edge adapted to be supported on the upper end of the column, the crown having four radially extending fins each with an enlarged height at its radially exterior edge and an upper surface at an angle of 45 degrees with respect to the vertical, each upper surface having a dove tail recess;

cylindrical bushing sleeve positioned within the bore of the column, the bushing sleeve having an upper end located at an intermediate extent of the column and a lower end located beneath the lower end of the column, the bushing sleeve having an exterior surface in contact with the interior surface of the column, the bushing sleeve having an internal surface with spaced bushings of a bearing material adapted to receive and rotatably support the cylindrical stem of a valve to be ground, the bearing material being selected from the class of bearing materials including NYLON and BRONZE;

an aperture formed in an intermediate extent of the column with a securement component positioned in the aperture to contact and position the sleeve with respect to the column;

a plurality of grind pads, each with an upper surface and a lower dove-tail projection positioned in an associated dove-tail slot of the crown, the grind pads each having on its upper surface an abrasive hard aluminum flex file with an adhesive backing for securing such abrasive material to the grind pad at spaced lateral locations on the upper surface thereof;

said grinding pads being off center to allow the pads to be rotated 180 degrees to allow use of both sides of the pads; and securement means including a threaded pin having a tapering component on an axially interior end thereof, the pin being adjustably received in a threaded aperture in the associated grind pad, the threaded aperture having a cone-shaped recess at an axially interior end thereof at a different angle than that of the cone-shaped projection at the interior end of the threaded pin, whereby when the threaded pin is threadedly inserted into the threaded aperture, the axially interior end of the pin will cause an expansion of the dove-tail portion of the grind pad to lock in position, wherein a vertical slot in the grind pad allows this locking relationship to occur.

\* \* \* \* \*